US012777082B2

(12) United States Patent
Garg et al.

(10) Patent No.: US 12,777,082 B2
(45) Date of Patent: Oct. 27, 2026

(54) PARALLEL PROCESSING ON DYNAMICALLY SELECTED ALTERNATE CHANNEL IN RESPONSE TO NETWORK INTERRUPTION

(71) Applicant: Bank of America Corporation, Charlotte, NC (US)

(72) Inventors: Saurabh Garg, Faridabad (IN); Amit Mishra, Chennai (IN); Maneesh Kumar Sethia, Hyderabad (IN); Krithika Viswanathan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 265 days.

(21) Appl. No.: 18/775,334

(22) Filed: Jul. 17, 2024

(65) Prior Publication Data

US 2026/0025731 A1 Jan. 22, 2026

(51) Int. Cl.

| | |
|---|---|
| ***H04L 65/1095*** | (2022.01) |
| ***H04L 41/0654*** | (2022.01) |
| ***H04L 41/0668*** | (2022.01) |

(52) U.S. Cl.

CPC ...... *H04L 65/1095* (2022.05); *H04L 41/0654* (2013.01); *H04L 41/0668* (2013.01)

(58) Field of Classification Search

CPC .................................................. H04L 65/1095

See application file for complete search history.

(56) References Cited

U.S. PATENT DOCUMENTS

| | | | |
|---|---|---|---|
| 8,069,204 B2 | 11/2011 | Reisman | |
| 8,851,366 B2 | 10/2014 | Modi | |
| 9,483,276 B2 | 11/2016 | Busaba et al. | |
| 9,928,489 B2 | 3/2018 | Ohnishi et al. | |
| 11,223,689 B1 * | 1/2022 | Amdahl | H04L 69/14 |
| 11,783,307 B2 | 10/2023 | Folk et al. | |
| 2006/0190243 A1 * | 8/2006 | Barkai | G06F 16/24554 704/8 |
| 2013/0250755 A1 * | 9/2013 | Clark | H04L 12/5692 370/228 |

(Continued)

*Primary Examiner* — Clayton R Williams

(74) *Attorney, Agent, or Firm* — Banner & Witcoff, Ltd.

(57) ABSTRACT

Arrangements for providing connectivity monitoring and processing transfer are provided. A computing platform may monitor one or more networks and/or processing infrastructures to detect an ongoing transaction and/or an interruption in communication associated with an ongoing transaction. Based on the monitoring, the computing platform may detect a communication interruption with a first network processing an ongoing transaction via a first processing infrastructure. The computing platform may identify a plurality of available other networks and may prioritize the other available networks to identify a best available network. The computing platform may select the best available network as a network to which the ongoing transaction should be transferred and may transfer the transaction from the first processing infrastructure communicating via the first network to a second processing infrastructure communicating via the best available network. Processing of the transaction may then continue from the point of interruption via the second processing infrastructure.

20 Claims, 12 Drawing Sheets

(56) References Cited

U.S. PATENT DOCUMENTS

| | | | | |
|---|---|---|---|---|
| 2014/0173332 | A1* | 6/2014 | Bennah | G06F 11/2025 714/4.11 |
| 2017/0123929 | A1* | 5/2017 | Helleren | G06F 11/1441 |
| 2019/0279186 | A1 | 9/2019 | Gaddam et al. | |

* cited by examiner

PARALLEL PROCESSING ON DYNAMICALLY SELECTED ALTERNATE CHANNEL IN RESPONSE TO NETWORK INTERRUPTION

BACKGROUND

Aspects of the disclosure relate to electrical computers, systems, and devices for dynamic alternate channel selection in the case of network disruption.

Enterprise organizations process thousands or maybe even millions of events each day. Event processing by the enterprise organization relies on access to one or more networks, such as the internet. However, network connectivity and/or communication can be unpredictable and is susceptible to disruption due to a variety of factors (e.g., insufficient bandwidth, natural disaster, or the like). Accordingly, arrangements described herein provide for dynamic identification of alternate networks, in real-time and during an ongoing transaction or event processing, to continue to processing the event via a different processing infrastructure in order to provide a seamless event processing experience during times of network disruption.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with maintaining seamless event processing during network interruptions.

In some aspects, a computing platform may monitor one or more networks and/or processing infrastructures to detect an ongoing transaction and/or an interruption in communication or connectivity associated with an ongoing transaction. Based on the monitoring, the computing platform may detect a communication interruption with a first network processing an ongoing transaction via a first processing infrastructure. Based on the detected interruption, the computing platform may identify a plurality of available other networks. The computing platform may prioritize the other available networks to identify a best available network. The computing platform may then select that best available network as a network to which the ongoing transaction should be transferred.

In response to identifying the best available network, the transaction may be transferred from the first processing infrastructure communicating via a first network at which the interruption was detected to a second processing infrastructure communicating via the best available network. Processing of the transaction may then continue from the point of interruption via the second processing infrastructure.

In some examples, ongoing transaction processing data may be shared with the first processing infrastructure such that, when network connectivity is restored, the ongoing transaction may be transferred back to the first processing infrastructure communicating via the first network for further processing.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, event or transaction processing may rely on a network to provide communication between a user and an enterprise organization processing the event or transaction. However, interruptions to network connectivity or communication may cause errors in processing transactions or events, particularly when the transaction or event processing is ongoing as the disruption occurs.

Accordingly, aspects described herein provide for real-time, dynamic identification of an alternate network in order to continue processing the transaction via alternate infrastructure. In some examples, the data from the transaction may be synced to the original infrastructure such that, all data is maintained via both processing infrastructures. Accordingly, the transaction may be processed to completion via the alternate infrastructure and alternate network. In other examples, if connectivity to the first network is restored, the ongoing transaction may be transferred from the second infrastructure to the first and the transaction may be processed to completion via the first infrastructure and first network.

These and various other arrangements will be discussed more fully below.

Figure 1A:
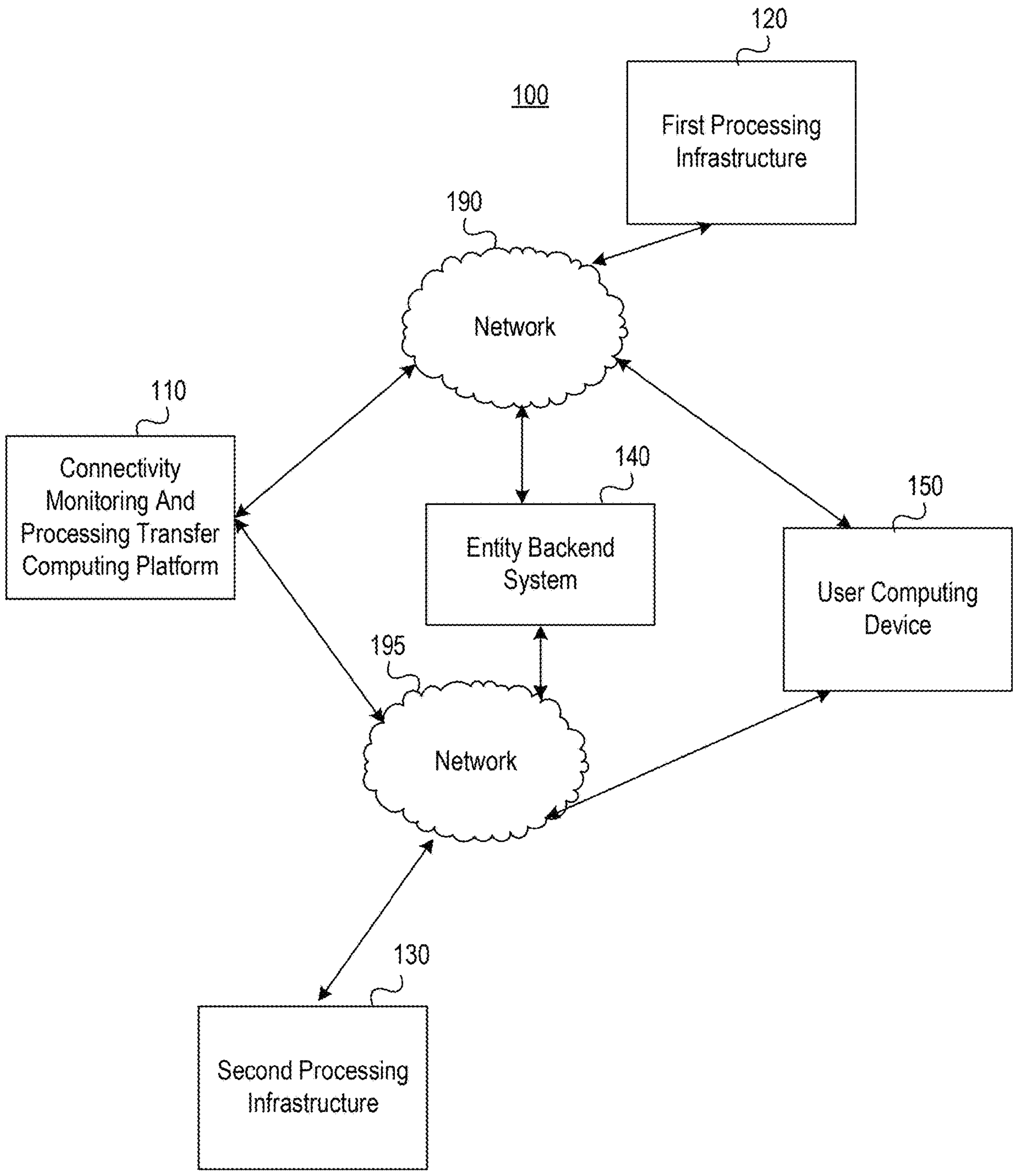
FIGS. 1A-1B depict an illustrative computing environment for implementing connectivity monitoring and processing transfer functions in accordance with one or more aspects described herein.
Figure 1B:
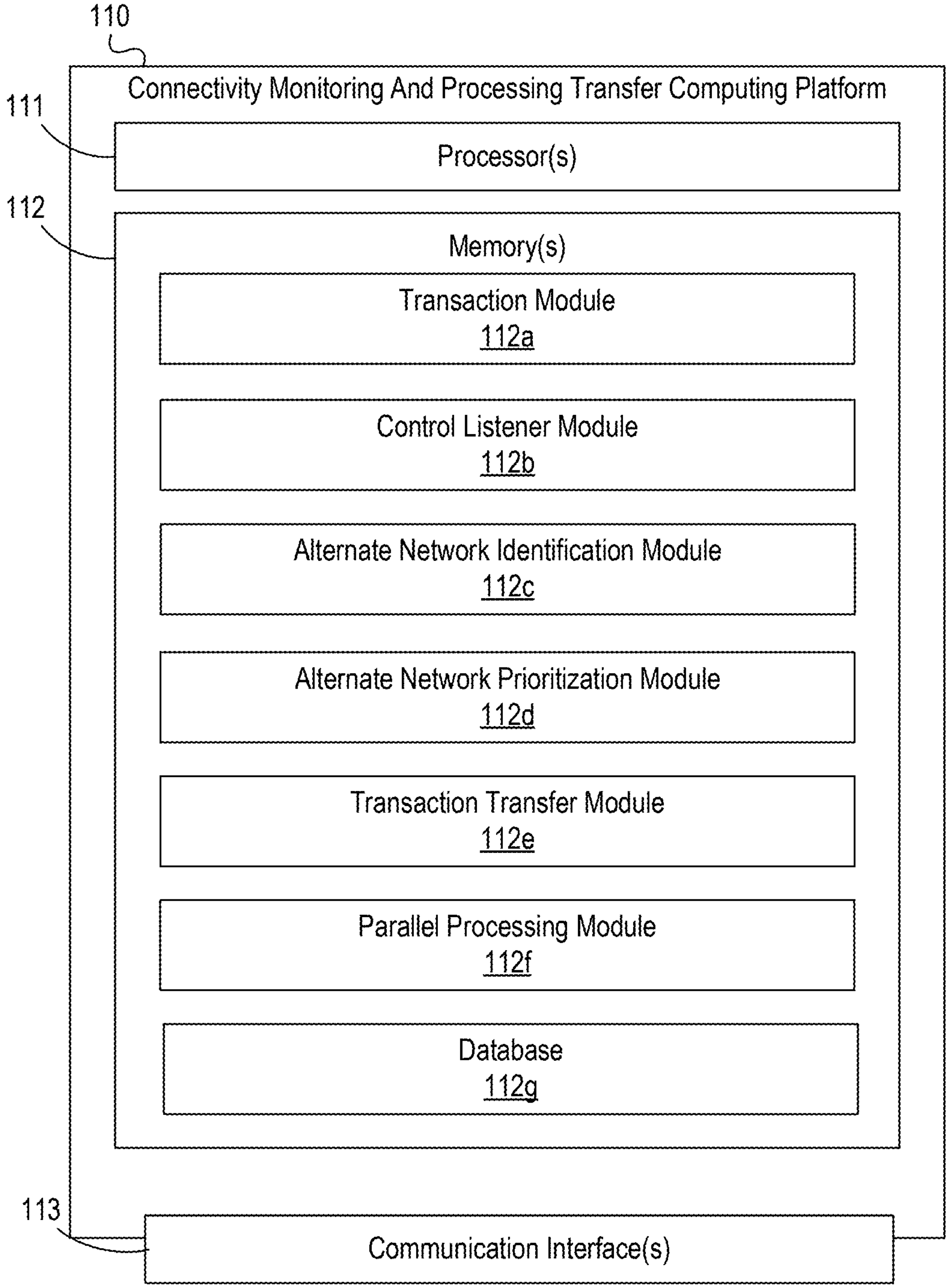

FIGS. 1A-1B depict an illustrative computing environment and devices for implementing connectivity monitoring and processing transfer functions in accordance with one or more aspects described herein. Referring to FIG. 1A, computing environment 100 may include one or more computing devices and/or other computing systems. For example, computing environment 100 may include connectivity monitoring and processing transfer computing platform 110, first processing infrastructure 120, second processing infrastructure 130, and entity backend system 140.

Although two processing infrastructures are shown, any number of systems or devices may be used without departing from the invention.

Connectivity monitoring and processing transfer computing platform 110 may be configured to perform intelligent, dynamic, real-time event monitoring and processing transfer functions. For instance, connectivity monitoring and processing transfer computing platform 110 may monitor one or more networks for ongoing transactions and interruptions to ongoing transactions. Upon detection of a network interruption during an ongoing transaction being processed on a first processing infrastructure communicating via a first network, connectivity monitoring and processing transfer computing platform 110 may identify a plurality of available networks to continue processing the ongoing transaction. Based on the available networks, may evaluate parameters of each network to identify a best available network for further processing the ongoing transaction. In some examples, parameters may include signal strength, proximity to network, number of hops between source and destination, and the like.

Upon identifying the best available network, connectivity monitoring and processing transfer computing platform 110 may transfer the ongoing transaction to second processing infrastructure communicating via a second network (e.g., the best available network). The second processing infrastructure may continue processing the transaction. As continued processing of the transaction is ongoing at the second infrastructure, data captured during the further processing may be synced or shared with the first processing infrastructure. Accordingly, all details of the transaction processing may be captured or maintained by the first processing infrastructure and the second processing infrastructure in parallel.

In some examples, connectivity monitoring and processing transfer computing platform 110 may continue monitoring networks to determine whether connectivity or communication was restored to the first network. If not, the second processing infrastructure may continue processing the event to completion. If so, the transaction may be transferred back to the first processing infrastructure for further processing (e.g., based on the parallel capture of data associated with the ongoing transaction processing).

First processing infrastructure 120 may be or include one or more computer components (e.g., servers, server blades, memory, processors, or the like) and may include a transaction processing channel, such as online banking, mobile banking, ATM, or the like. Accordingly, first processing infrastructure 120 may include one or more devices or systems through which a user may initiate a transaction, process a transaction, and the like. In some examples, the first processing infrastructure may communicate with connectivity monitoring and processing transfer computing platform 110, as well as entity backend system 140, via a first network 190.

Second processing infrastructure 130 may be or include one or more computer components (e.g., servers, server blades, memory, processors, or the like) and may include a second, different processing channel such as SMS, email, or the like. Accordingly, second processing infrastructure 130 may include one or more devices or systems that may receive an ongoing transaction for further processing. In some examples, the second processing infrastructure 130 may communicate with connectivity monitoring and processing transfer computing platform 110, as well as entity backend system 140, via a second network 195.

In some examples, each processing infrastructure may be associated with a different channel of communication (e.g., email, SMS, or the like). Additionally or alternatively, some channels of communication may be available via multiple processing infrastructures and/or via multiple types of networks.

Entity backend system 140 may be or include one or more computer components (e.g., servers, server blades, memory, processors, or the like) and may include one or more systems or applications for processing transactions at the enterprise organization. For instance, entity backend system 140 may include systems, devices or applications for authenticating a user, verifying account balance, transferring funds between accounts, updating an account ledger, and the like. Entity backend system 140 may process the transaction being performed via either the first processing infrastructure or second processing infrastructure and may facilitate syncing or sharing of the ongoing transaction processing data with both the first and second processing infrastructure.

User computing device 150 may be or include one or more computing devices, such as a laptop computer, desktop computer, smartphone, mobile device, wearable device, or the like and may be configured to communicate with connectivity monitoring and processing transfer computing platform 110, as well as second processing infrastructure 130 and/or entity backend system 140 via second network 195. In some examples, user computing device 150 may also be used to communicate with first processing infrastructure 120 (and/or connectivity monitoring and processing transfer computing platform 110, entity backend system 140, and the like) via first network 190.

As mentioned above, computing environment 100 also may include one or more networks, which may interconnect one or more of connectivity monitoring and processing transfer computing platform 110, first processing infrastructure 120, second processing infrastructure 130, entity backend system 140, and/or user computing device 150. For example, computing environment 100 may include first network 190, which may be a public or private network. First network 190 may include one or more sub-networks (e.g., Local Area Networks (LANs), Wide Area Networks (WANs), or the like). First network 190 may interconnect one or more computing devices associated with the organization. For example, connectivity monitoring and processing transfer computing platform 110, first processing infrastructure 120, entity backend system 140, and/or user computing device 150 may be connected via first network 190. Computing environment 100 may further include second network 195, which may be a public or private network. Second network 195 may include one or more sub-networks (e.g., Local Area Networks (LANs), Wide Area Networks (WANs), or the like). Second network 195 may interconnect one or more computing devices associated with the organization. For example, connectivity monitoring and processing transfer computing platform 110, second processing infrastructure 130, entity backend system 140, and/or user computing device 150 may be connected via second network 195.

Referring to FIG. 1B, connectivity monitoring and processing transfer computing platform 110 may include one or more processors 111, memory 112, and communication interface 113. A data bus may interconnect processor(s) 111, memory 112, and communication interface 113. Communication interface 113 may be a network interface configured to support communication between connectivity monitoring and processing transfer computing platform 110 and one or more networks (e.g., private network 190, or the like). Memory 112 may include one or more program modules having instructions that when executed by processor(s) 111 connectivity monitoring and processing transfer computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of connectivity monitoring and processing transfer computing platform 110 and/or by different computing devices that may form and/or otherwise make up connectivity monitoring and processing transfer computing platform 110.

For example, memory 112 may have, store and/or include transaction module 112*a*. Transaction module 112*a* may store instructions and/or data that may cause or enable the connectivity monitoring and processing transfer computing platform 110 to detect initiation of a transaction. For instance, transaction module 112*a* may receive an indication that a transaction has been initiated at a first processing infrastructure 120 communicating via a first network 190 with the connectivity monitoring and processing transfer computing platform 110 and the entity backend system 140. In some examples, the first processing infrastructure 120 may include a mobile banking application executing on a user computing device, an online banking application, an automated teller machine (ATM), or the like. In some arrangements, the first network 190 may include a WIFI network, Bluetooth network, virtual private network (VPN), radio frequency identification, near-field communication network, or the like.

Connectivity monitoring and processing transfer computing platform 110 may further have, store and/or include a control listener module 112*b*. Control listener module 112*b* may store instructions and/or data that may cause or enable the connectivity monitoring and processing transfer computing platform 110 to detect an interruption in network communication associated with an ongoing transaction. For instance, control listener module 112*b* may monitor network communications and/or connectivity associated with network being used in ongoing transaction processing (e.g., first network 190) to detect any interruptions in communication or connectivity. If an interruption is detected, control listener module 112*b* may begin a timer or counter to determine or evaluate a length of the interruption. If at least a threshold time has passed before connectivity or communication is restored, an alternate network may be identified.

Connectivity monitoring and processing transfer computing platform 110 may further have, store and/or include alternate network identification module 112*c*. Alternate network identification module 112*c* may store instructions and/or data that may cause or enable the connectivity monitoring and processing transfer computing platform 110 to identify or detect one or more alternate available networks in response to a detected interruption in connectivity or communication of a first network 190 during an ongoing transaction. In some examples, alternate network identification module 112*c* may rely on data provided by control listener module 112*b* to identify one or more available alternate networks.

Connectivity monitoring and processing transfer computing platform 110 may further have, store and/or include alternate network prioritization module 112*d*. Alternate network prioritization module 112*d* may store instructions and/or data that may cause or enable the connectivity monitoring and processing transfer computing platform 110 to prioritize the alternate networks identified by alternate network identification module 112*c* based on one or more parameters. For instance, alternate network prioritization module 112*d* may prioritize the identified networks based on parameters such as signal strength associated with each alternate network, proximity to each alternate network, number of hops required from the user device for each alternate network, and the like. Based on the parameters, the alternate network prioritization module 112*d* may identify a best available network to be used as the second, alternate network to continue transaction processing.

Connectivity monitoring and processing transfer computing platform 110 may further have, store and/or include transaction transfer module 112*e*. Transaction transfer module 112*e* may store instructions and/or data that may cause or enable the connectivity monitoring and processing transfer computing platform 110 to transfer an ongoing transaction from the first processing infrastructure associated with the first network to a second processing infrastructure associated with the second, alternate network. In some examples, the second processing infrastructure may include SMS transmitted via the second, alternate network. The ongoing transaction may then continue processing and interacting with the user via the second processing infrastructure and the second, alternate network. In some examples, the user may notice or be aware of the change in processing infrastructure but the transaction processing may continue with minimal or no interruption.

Connectivity monitoring and processing transfer computing platform 110 may further have, store and/or include parallel processing module 112*f*. Parallel processing module 112*f* may store instructions and/or data that may cause or enable the connectivity monitoring and processing transfer computing platform 110 to sync details of the ongoing transaction with the first processing infrastructure to ensure the first processing infrastructure can resume the ongoing transaction from any current point if the first network connectivity becomes available. Accordingly, the ongoing transaction and transaction details may be processed in parallel via the first processing infrastructure that no longer has connectivity with the user (e.g., via entity backend system 140 and based on transaction details received via the second processing infrastructure) to ensure that all data is available to the user and the transaction can resume from a current step if connectivity is restored.

Connectivity monitoring and processing transfer computing platform 110 may further have, store and/or include database 112*g*. Database 112*g* may store data associated with ongoing transaction processing, alternate networks, and/or other data to perform the functions of the connectivity monitoring and processing transfer computing platform 110.

FIGS. 2A-2F depict one example illustrative event sequence for connectivity monitoring and processing transfer in accordance with one or more aspects described herein. The events shown in the illustrative event sequence are merely one example sequence and additional events may be added, or events may be omitted, without departing from the invention. Further, one or more processes discussed with respect to FIGS. 2A-2F may be performed in real-time or near real-time.

Figure 2A:
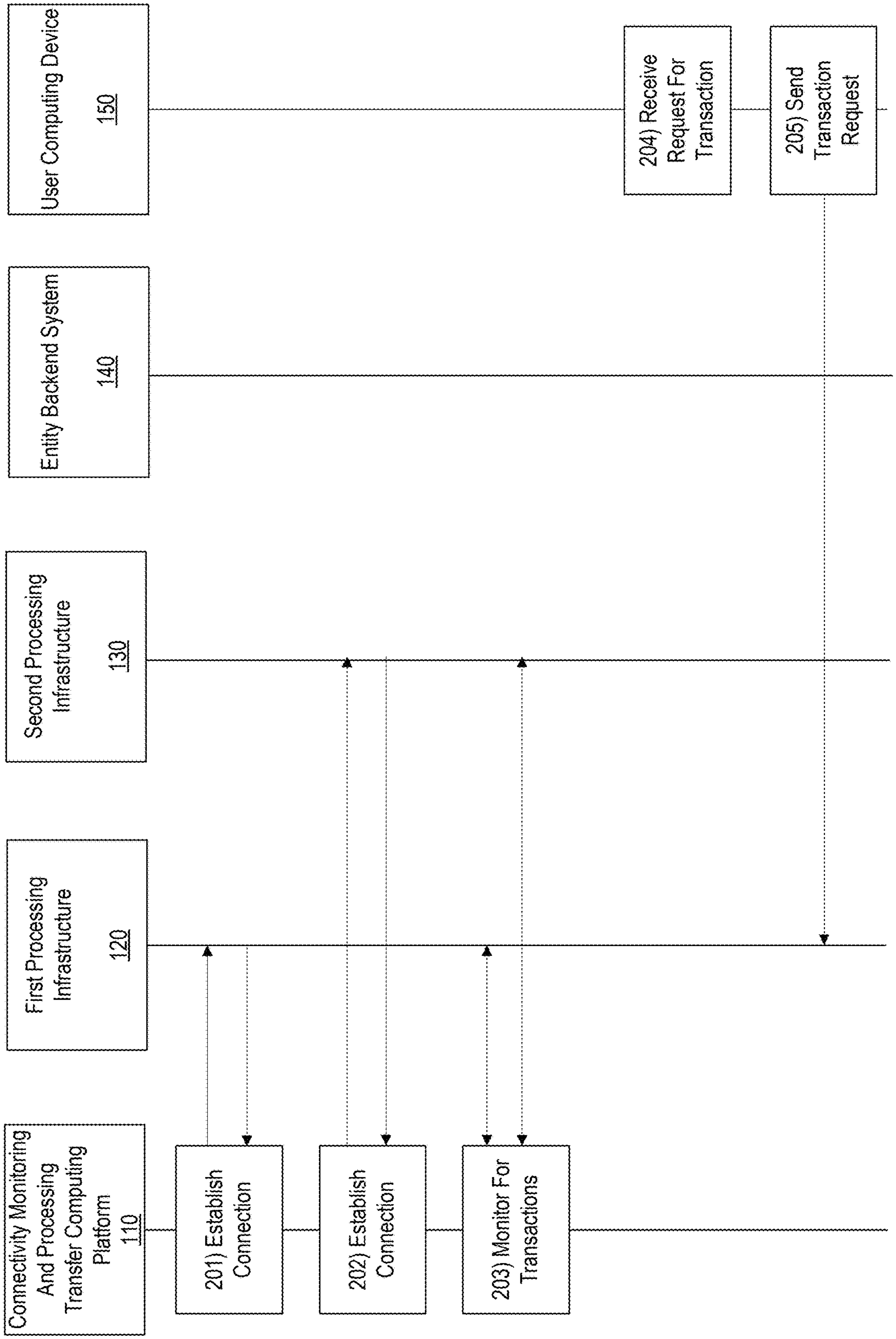
FIGS. 2A-2F depict an illustrative event sequence for connectivity monitoring and processing transfer in accordance with one or more aspects described herein.

With reference to FIG. 2A, connectivity monitoring and processing transfer computing platform 110 may establish connections with one or more processing infrastructures to enable monitoring for initiated or ongoing transactions that may be transferred if connectivity is lost. Accordingly, at step 201, connectivity monitoring and processing transfer computing platform 110 may establish a connection with first processing infrastructure 120. For instance, connectivity monitoring and processing transfer computing platform 110 may establish a first wireless connection with first processing infrastructure 120. Upon establishing the first wireless connection, a communication session may be initiated between connectivity monitoring and processing transfer computing platform 110 and first processing infrastructure 120.

At step 202, connectivity monitoring and processing transfer computing platform 110 may establish a connection with second processing infrastructure 130. For instance, connectivity monitoring and processing transfer computing platform 110 may establish a second wireless connection with second processing infrastructure 130. Upon establishing the first wireless connection, a communication session may be initiated between connectivity monitoring and processing transfer computing platform 110 and second processing infrastructure 130.

At step 203, connectivity monitoring and processing transfer computing platform 110 may monitor the infrastructures to which the connectivity monitoring and processing transfer computing platform 110 is connected for initiated or ongoing transactions (e.g., that may be transferred due to network connectivity issues). In some examples, connectivity monitoring and processing transfer computing platform 110 may continuously monitor all infrastructures (e.g., first processing infrastructure 120, second processing infrastructure 130, and the like) for transactions.

At step 204, user computing device 150 may receive a request to initiate a transaction. For instance, a user may input, to the user computing device 150 (e.g., via a touchscreen, keypad, or other input device) a request to initiate a transaction. In some examples, the request may be initiated via a first processing infrastructure (e.g., online banking, mobile banking, or the like) accessed via an application executing on the user computing device 150 or accessed via the user computing device 150.

At step 205, user computing device 150 may transmit or send the request to initiate the transaction to the first processing infrastructure 120. The request to initiate the transaction may include transaction details, user information, and the like.

Figure 2B:
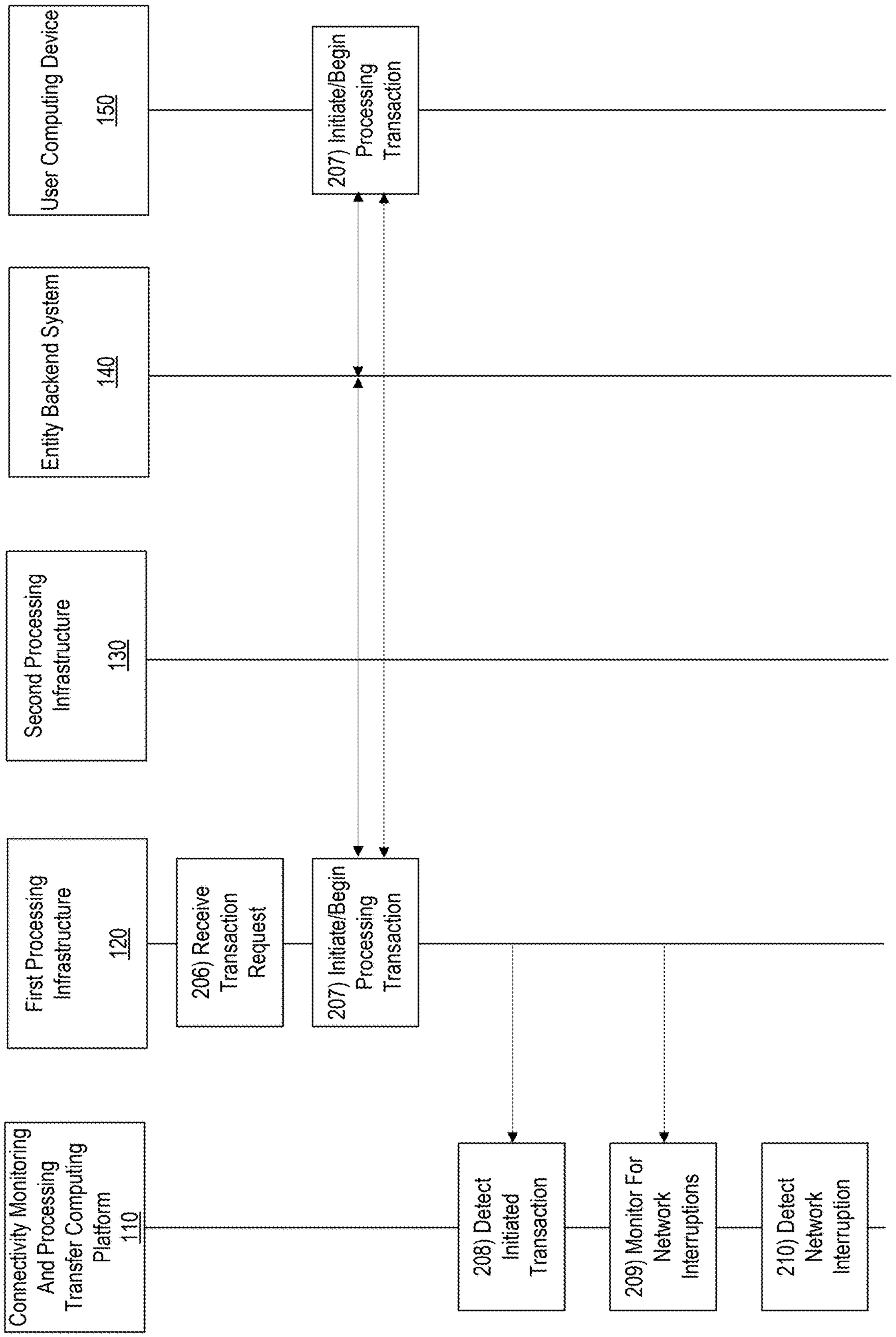

With reference to FIG. 2B, at step 206, first processing infrastructure may receive the request to initiate the transaction received from the user computing device 150 at step 205.

At step 207, in response to receiving the request, first processing infrastructure may initiate the requested transaction and begin processing the transaction. In some examples, initiating and/or beginning to process the transaction may cause the first processing infrastructure to communicate with a user via user computing device 150. For instance, one or more requests for transaction details me be provided to the user via one or more user interfaces displayed on a display of the user computing device 150. For instance, the user interfaces may request selection of a type of transaction, an amount of transaction, a payee of the transaction, or the like.

Figure 4:
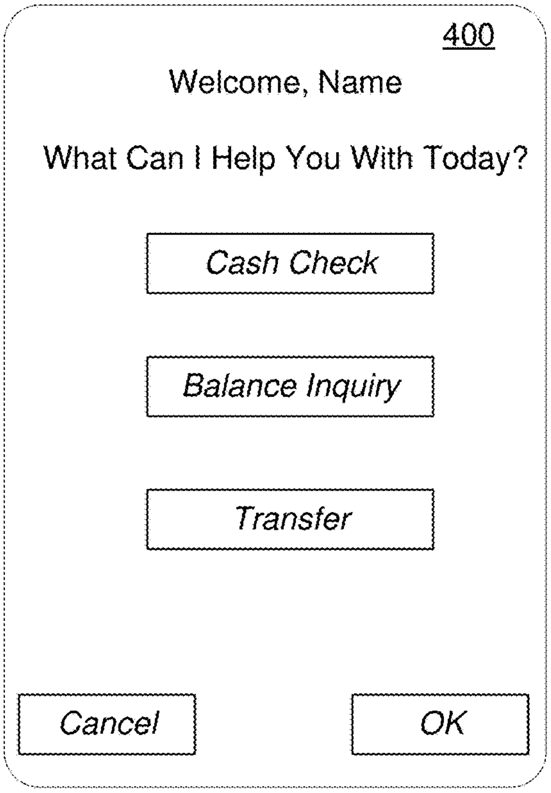
FIGS. 4-7 illustrate example user interfaces that may be generated according to one or more aspects described herein.
Figure 5:
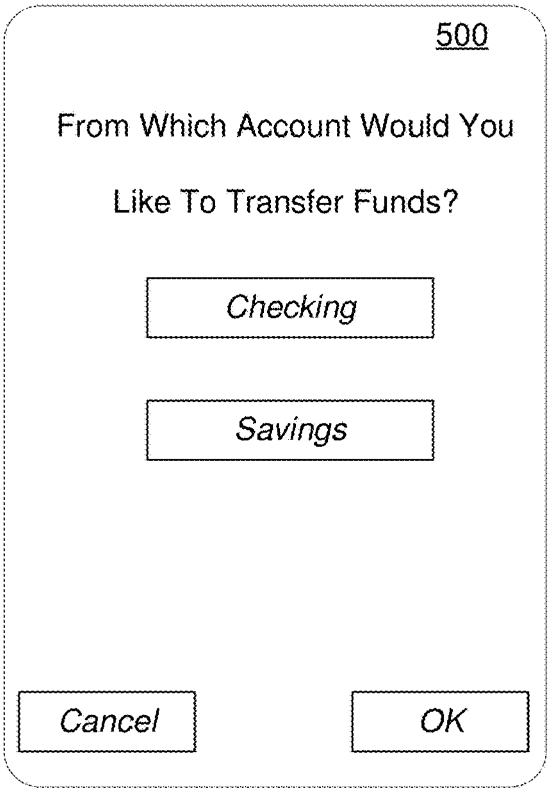

In some examples, data may be requested from a user via a series of user interfaces presented as steps within the transaction (e.g., first select a type of transaction, second select an amount, and the like). For instance, FIGS. 4 and 5 illustrate example user interfaces that may be presented via the first processing infrastructure 120 (e.g., via a mobile banking application, online banking application or session, or the like) to the user via the user computing device 150. The user interface 400 in FIG. 4 illustrates an example request for selection of a type of transaction. After receiving user response data indicating, for example, the user would like to transfer funds, the interface 500 in FIG. 5 may present options for various accounts from which funds may be transferred.

The transaction processing information may be transmitted or sent to entity backend system 140 for processing. For instance, entity backend system 140 may include one or more applications, systems, or the like, to authenticate a user, identify account information of a user, update an account ledger, transfer or dispense funds, or the like. Accordingly, entity backend system 140 may receive transaction details and process transaction data and/or identify additional data needed for transaction processing.

At step 208, connectivity monitoring and processing transfer computing platform 110 may detect initiation of the transaction at step 207. For instance, based on monitoring first processing infrastructure 120, connectivity monitoring and processing transfer computing platform 110 may detect that a transaction has been initiated.

In response to detecting that a transaction has been initiated, at step 209, connectivity monitoring and processing transfer computing platform 110 may monitor for network connectivity or communication interruptions between the user computing device 150 and the first processing infrastructure 120. For instance, one or more control listeners may monitor network traffic, connectivity, availability and the like, to detect an interruption during the ongoing transaction processing.

At step 210, connectivity monitoring and processing transfer computing platform 110 may detect an interruption to network connectivity or communication. In some examples, upon detecting an interruption, connectivity monitoring and processing transfer computing platform 110 may begin a counter to determine a duration of the interruption. If the duration lasts at least a threshold amount of time, the transaction may be transferred and the process may proceed to step 211 in FIG. 2C. If the interruption is resolved in less than the threshold duration of time, the process may return to step 209 to continue monitoring for additional interruptions.

Figure 2C:
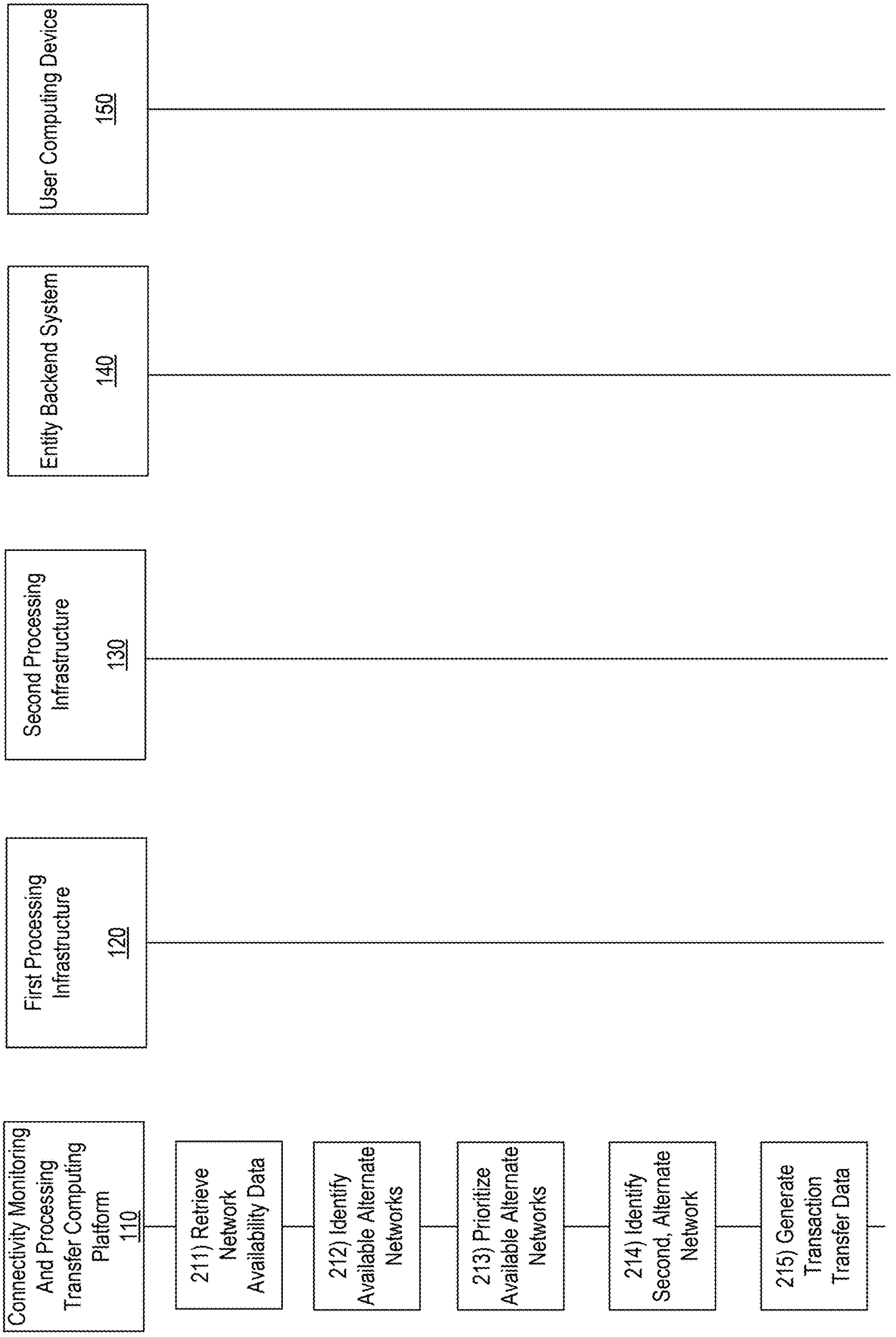

With reference to FIG. 2C, at step 211, in response to the detected interruption lasting at least the threshold amount of time, connectivity monitoring and processing transfer computing platform 110 may retrieve network availability data from one or more alternate networks. For instance, if the first processing infrastructure 120 was communicating with the user computing device via a first network that was, for example, a WI-FI network, connectivity monitoring and processing transfer computing platform 110 may retrieve availability data from one or more alternate networks (e.g., cellular, NFC, Bluetooth, or the like) that may be used to continue processing the transaction via alternate processing infrastructure.

At step 212, based on the retrieved availability data, connectivity monitoring and processing transfer computing platform 110 may identify one or more available alternate networks. For instance, connectivity monitoring and processing transfer computing platform 110 may identify that Bluetooth and cellular networks are available. Various other types of alternate networks may be available.

At step 213, connectivity monitoring and processing transfer computing platform 110 may prioritize the one or more alternate available networks. For instance, connectivity monitoring and processing transfer computing platform 110 may evaluate parameters such as signal strength, proximity to network, number of hops, and the like, to prioritize the available networks.

Based on the prioritizing, at step 214, connectivity monitoring and processing transfer computing platform 110 may identify a best available alternate network and may select the best available alternate network as the second, alternate network to continue processing the transaction while the first network interruption continues. In one example, the second, alternate network may be a cellular network. This is just one example and various other networks may be selected without departing from the invention.

At step 215, connectivity monitoring and processing transfer computing platform 110 may generate transaction transfer data to facilitate transfer of the processing of the ongoing transaction to the second, alternate network and the second processing infrastructure 130 associated therewith. In some examples, the transaction transfer data may include an instruction or command causing the second processing infrastructure to continue processing the transaction from a current step and may identify the current step in the transaction. For instance, if the user selected to transfer funds to another user, the user may have selected the transaction type as transfer and may have identified the account from which the funds may be transferred before the transaction was interrupted. According, the transaction transfer data may identify that the continued processing should begin with a request for the party to whom or account to which the funds are being transferred, identification of an amount of the transfer, and the like.

Figure 2D:
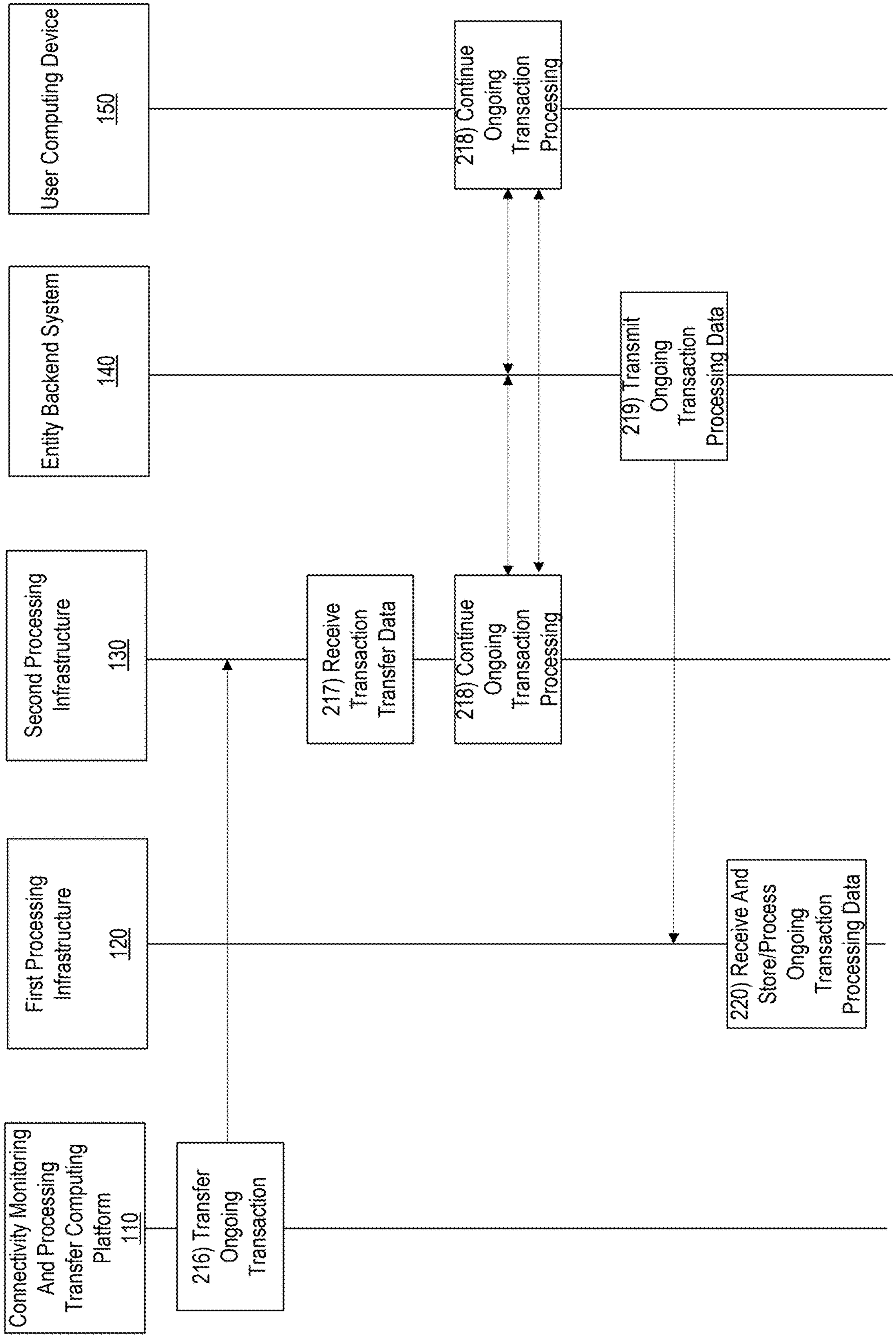

With reference to FIG. 2D, at step 216, connectivity monitoring and processing transfer computing platform 110 may transfer the ongoing transaction to the second processing infrastructure 130 communicating via the second, alternate network. In some examples, transferring the ongoing transaction may include transmitting the instruction to transfer processing, as well as identification of a next or current step of the transaction to enable the second processing infrastructure to pick up the ongoing transaction at an appropriate step without requiring the user to being the transaction again from the start.

Figure 6:
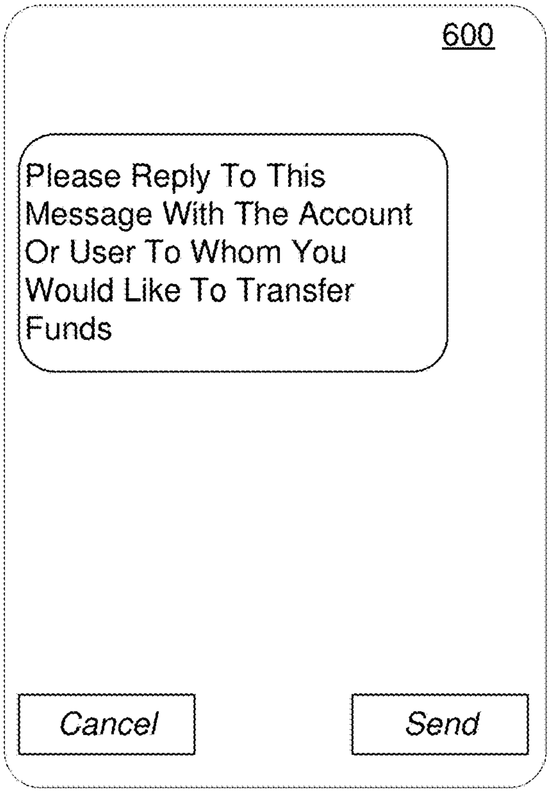

At step 217, second processing infrastructure 130 may receive the transaction transfer data associated with the ongoing transaction and may resume or continue processing of the transaction at step 218. For instance, the second processing infrastructure may communicate with the user computing device 150 and the entity backend system 140 to continue processing of the ongoing transaction. In continuing the example above, if a next step in the transaction is identification of a person or account to which the funds will be transferred, second processing infrastructure may request that data via, for instance, SMS, from the user computing device 150 and will communicate the data to the entity backend system 140 for further processing. FIG. 6 illustrates one example user interface 600 displaying an SMS message sent via the second network (e.g., a cellular network) requesting identification of a user or account to which the funds will be transferred.

At step 219, entity backend system 140 may transmit or send the details of the ongoing transaction being processed by the second processing infrastructure 130 to the first processing infrastructure 120 (e.g. based on communication between the entity backend system 140 and the first processing infrastructure 120 being on a network different from the interrupted network between the first processing infrastructure 120 and the user computing device).

While communicating the details of the ongoing transaction processing is shown as being performed by the entity backend system 140, in some examples, the sharing of the ongoing transaction details may be captured by the connectivity monitoring and processing transfer computing platform 110 and shared by the connectivity monitoring and processing transfer computing platform 110 with the first processing infrastructure 120.

At step 220, first processing infrastructure may receive and store/process the details from the ongoing transaction in parallel with the ongoing transaction currently being processed by the second processing infrastructure 130. Accordingly, the first processing infrastructure 120 may have all current details of the ongoing transaction should connectivity with the first network be restored and the transaction returned to the first processing infrastructure 120 for processing to completion.

Figure 2E:
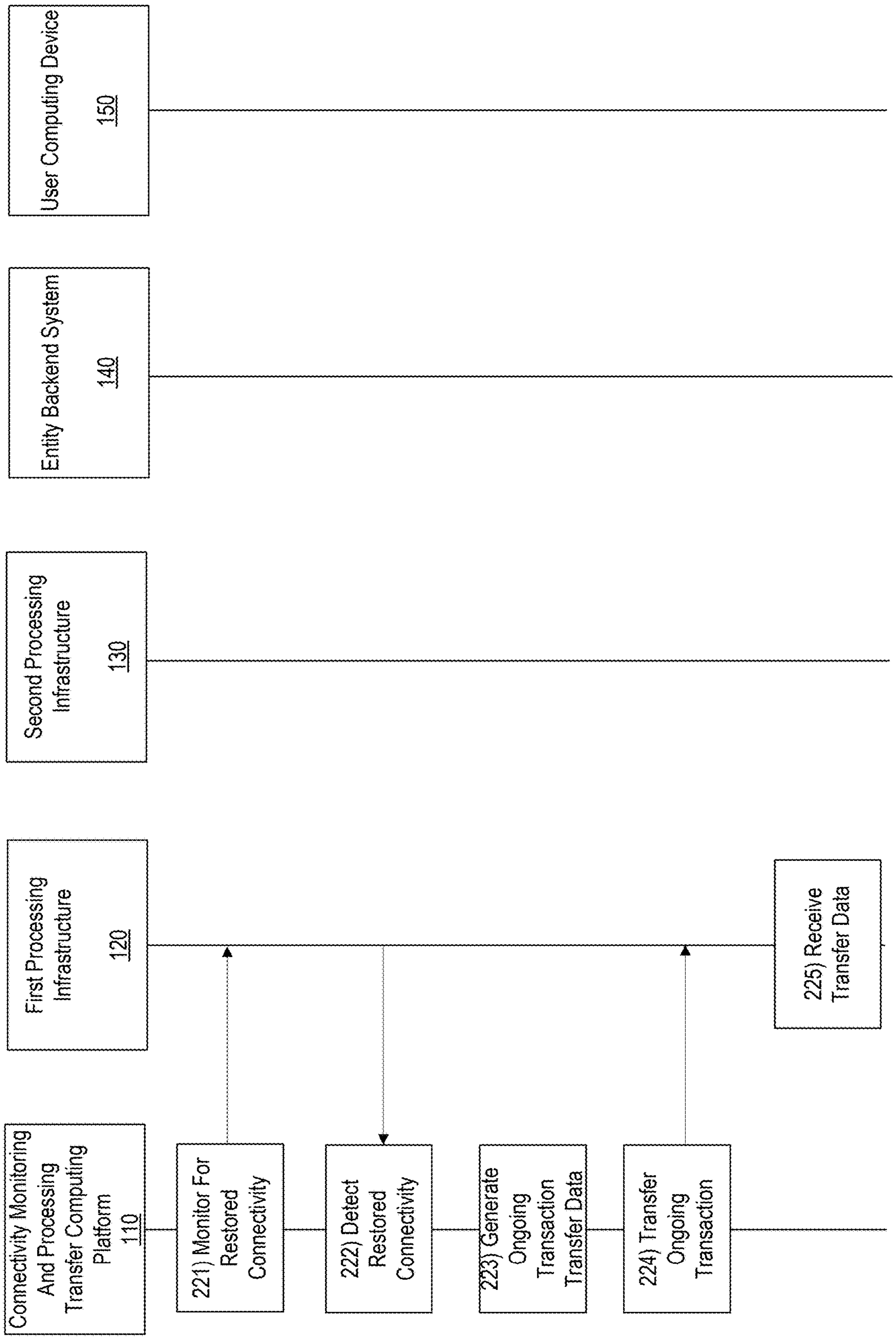
Figure 2F:
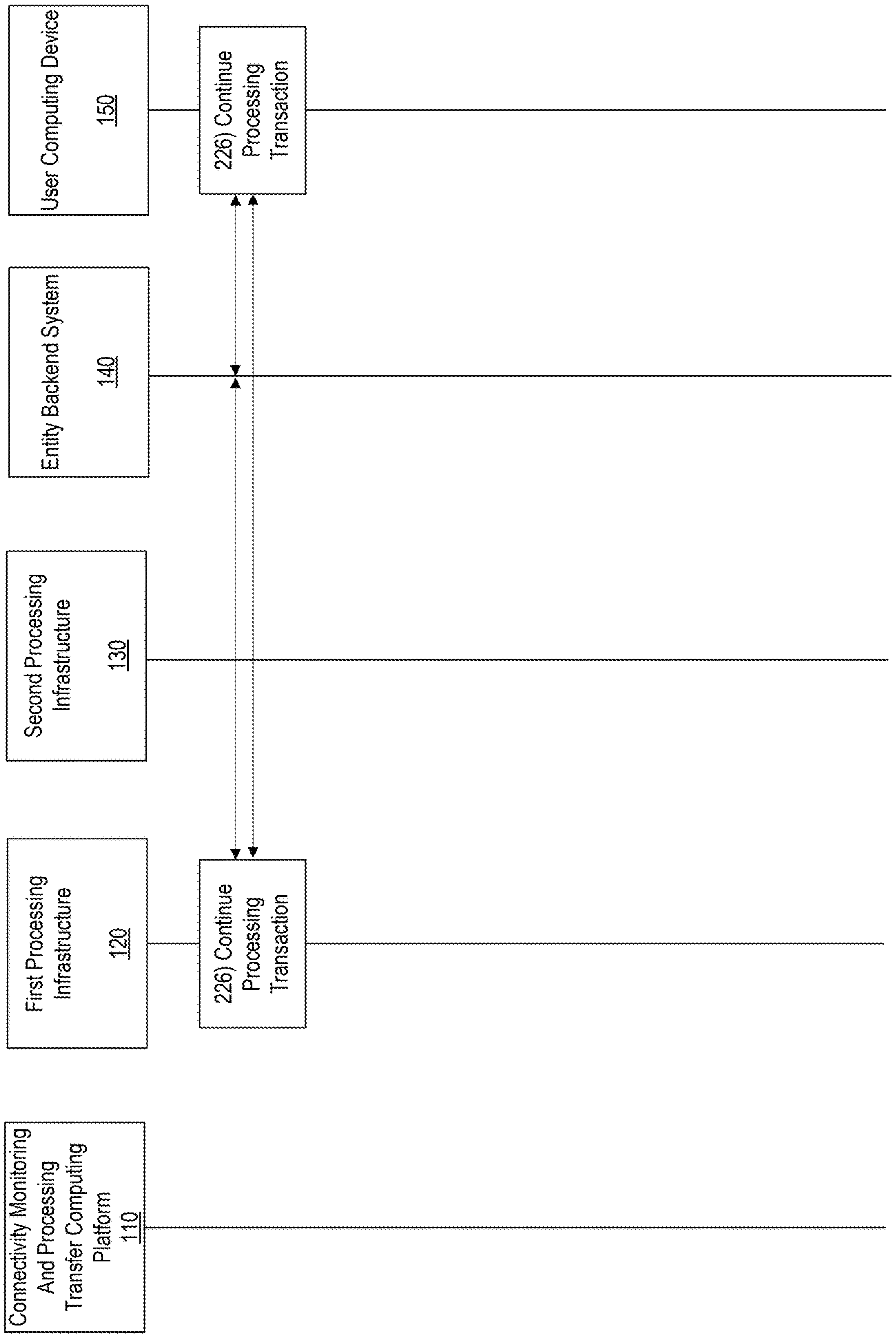

With reference to FIG. 2E, at step 221, connectivity monitoring and processing transfer computing platform 110 may monitor the first network for restored connectivity or communication with the first network (e.g., the network at which the interruption was detected). For instance, connectivity monitoring and processing transfer computing platform 110 may continuously monitor (e.g., as the transaction processing continues via the alternate network and second processing infrastructure 130) the first network to determine whether communication has been restored.

At step 222, connectivity monitoring and processing transfer computing platform 110 may detect restored connectivity or communication with the first network. Accordingly, at step 223, connectivity monitoring and processing transfer computing platform 110 may generate further transaction transfer data. For instance, connectivity monitoring and processing transfer computing platform 110 may generate an instruction or command to transfer the further processing of the transaction back to the first processing infrastructure 120 communicating via the first network. The further transaction transfer data may include identification of a current step of the transaction (e.g., if the user has identified the person or account to which the funds should be transferred, the further transaction transfer data may identify a current step as a request for the amount of the funds being transferred).

At step 224, connectivity monitoring and processing transfer computing platform 110 may transfer the ongoing to transaction back to the first processing infrastructure 120 for processing to completion.

Figure 7:
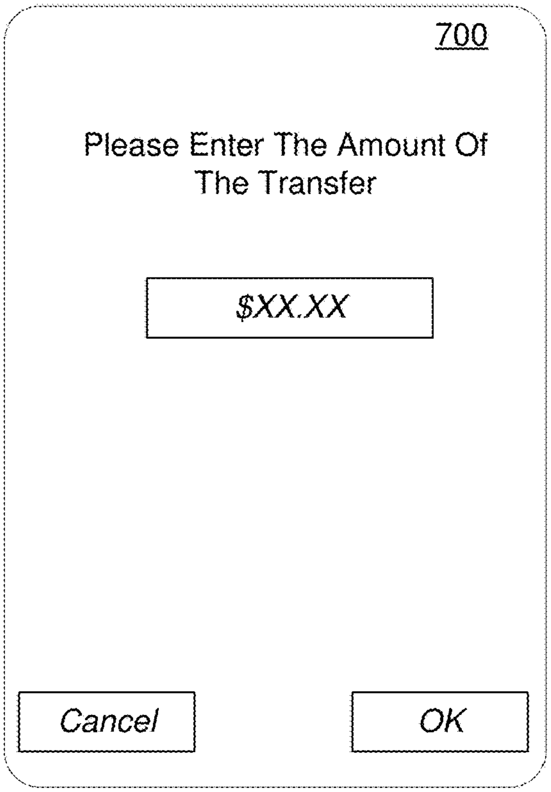

At step 225, first processing infrastructure 120 may receive the transfer data and may resume processing of the transaction. For instance, at 226, the first processing infrastructure may communicate with the user computing device 150 via the restored communication with the first network to process the transaction to completion. For instance, in continuing the example above, first processing infrastructure may request the amount of the transfer via the mobile banking application, online banking application, or the like, that was used to initiate the transaction (e.g., rather than SMS as used by the second processing infrastructure 130). FIG. 7 illustrates one example user interface 700 requesting an amount of the transaction via the first processing infrastructure. The data may be communicated to the entity backend system 140 and the transaction may be processed to completion.

Although the arrangements shown in FIGS. 2A-2F include final processing of the transaction at the first processing infrastructure via the first network, in some examples, if connectivity is not restored, the second processing infrastructure may process the transaction to completion via the second, alternate network without departing from the invention.

Figure 3:
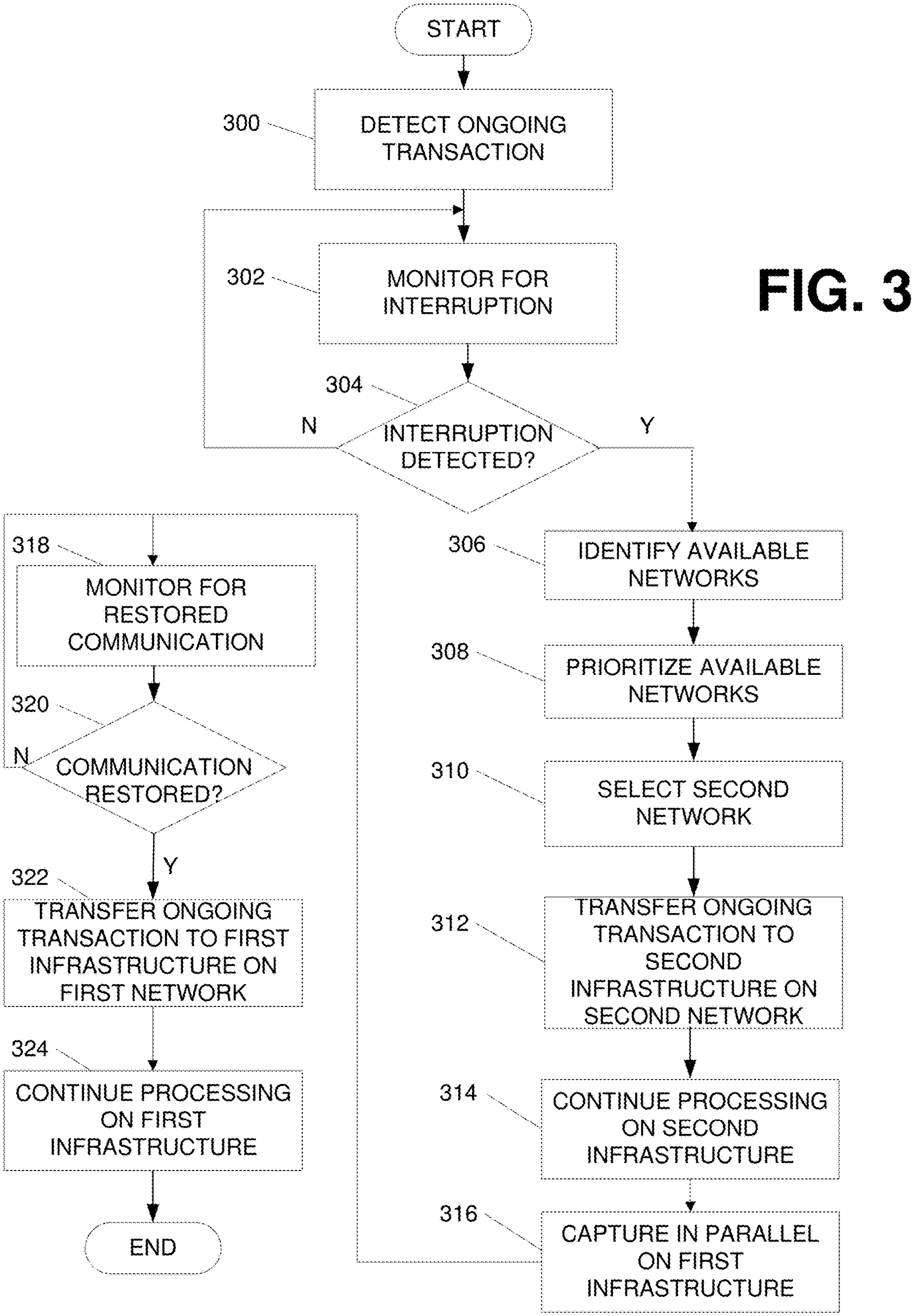
FIG. 3 illustrates an illustrative method for connectivity monitoring and processing transfer functions according to one or more aspects described herein.

FIG. 3 is a flow chart illustrating one example method of connectivity monitoring and processing transfer in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, connectivity monitoring and processing transfer computing platform 110 may detect an ongoing transaction initiated at a first processing infrastructure communicating via a first network. In some examples, the first processing infrastructure may be one of an ATM, mobile banking application or session, online banking application, or the like) communicating via the first network.

At step 302, connectivity monitoring and processing transfer computing platform 110 may monitor one or more networks associated with ongoing transactions, including the first network, for network connectivity or communication interruptions. For instance, connectivity monitoring and processing transfer computing platform 110 may monitor at least the first network for an interruption in communications.

At step 304, connectivity monitoring and processing transfer computing platform 110 may determine whether a network connectivity or communication interruption is detected. If not, the process may return to step 302 to continue monitoring.

If a network interruption is detected (and occurs for at least a threshold amount of time), at step 306, one or more available alternate networks may be identified by the connectivity monitoring and processing transfer computing platform 110. For instance, data from one or more control listeners may be used to identify available networks.

At step 308, connectivity monitoring and processing transfer computing platform 110 may prioritize the identified available networks by evaluating parameters associated with each available network to identify a best available network. In some examples, parameters considered may include signal strength of the network, proximity of the network to the user location, number of hops between a source and a destination within the network, and the like.

At step 310, based on the prioritization, connectivity monitoring and processing transfer computing platform 110 may identify a second network that is the best available network to which transaction processing should be transferred.

Based on the identified second network, the ongoing transaction may be transferred to second processing infrastructure communicating via the second network at step 312. For instance, the ongoing transaction may be transferred to a second processing infrastructure (e.g., SMS) communicating via the second network and processing of the transaction may continue with minimal interruption to the user at step 314.

In some examples, the second processing infrastructure may process the transaction to completion. In other examples, as network status is continuously monitored by the computing platform, if connectivity or communication via the first network is restored, the ongoing transaction may be transferred back to the first processing infrastructure for continued or final processing. Accordingly, at step 316, the connectivity monitoring and processing transfer computing platform 110 may sync or otherwise capture, in parallel, the data associated with continued transaction processing at the second processing infrastructure with the first processing infrastructure such that, if connectivity is restored, the transaction may continue processing at the first processing infrastructure at a current point, rather than at a point at which the initial interruption occurred or from a start of the transaction.

At step 318, connectivity monitoring and processing transfer computing platform 110 may continue monitoring network status to determine if communication via the first network is restored.

At step 320, a determination may be made as to whether first network communication is restored. If not, the process may return to step 318 for continued monitoring (e.g., until first network connectivity is restored or until the transaction is processed to completion by the second processing infrastructure 130).

If communication via the first network is restored, at step 322, connectivity monitoring and processing transfer computing platform 110 may transfer the ongoing transaction to the first processing infrastructure for further processing. First processing infrastructure may have access to current transaction details based on parallel processing of ongoing transaction data. Accordingly, first processing infrastructure may continue to process the ongoing transaction from a current point in the transaction (e.g., where the second processing infrastructure left off) at step 324. In some examples, first processing infrastructure may process the transaction to completion.

Accordingly, the arrangements described herein provide for dynamic, real-time identification of alternate networks and channels of communication during a network interruption to provide seamless transaction processing. The arrangements described enable real-time identification of a best available alternate network to which to transfer transaction processing from the point of interruption to avoid use of additional computing resources to restart the transaction from the beginning.

Aspects described herein may be used to identify day-to-day interruptions in communication and to identify interruptions related to catastrophic failures (e.g., natural disasters, and the like). Accordingly, while a user may be aware of an interruption (e.g., based on the change in interface associated with alternate processing infrastructure) the processing may continue despite the interruption.

As discussed herein, the computing platform may continuously monitor one or more networks for communication interruptions. Accordingly, transfer of transaction processing may be performed quickly and efficiently to provide limited interruption to the user experience.

Further, because parallel processing and/or recreation of the ongoing transferred transaction is shared with the initial or first processing infrastructure, the user may return to the first processing infrastructure upon restored communication with the first network to continue processing from the point at which communication was restored. In some examples, the additional data stored on the first processing infrastructure may be maintained for a predetermined period of time (e.g., five minutes, one hour, or the like). Accordingly, the data will be deleted at the expiration of the time period given that it is likely that the transaction was processed to completion via the second processing infrastructure and the data held on the first processing infrastructure might not be used.

In some examples, an expandable memory component may be included as part of the system to provide storage for additional data beyond the current transaction. In some examples, the expandable memory may be used to store a previous number of transactions, transactions processed within a preceding time period, or the like, to provide additional context to user intent and possibly provide additional options to the user. For instance, if a user performed a balance inquiry just prior to requesting the transfer, the data from the balance inquiry may be stored in the expandable memory to provide additional context to the user intent. In some examples, the memory may store metadata for a predetermined number of transactions, transactions within a preceding time period, all transactions, or the like, and may share the data without the various infrastructures when a transfer occurs.

Figure 8:
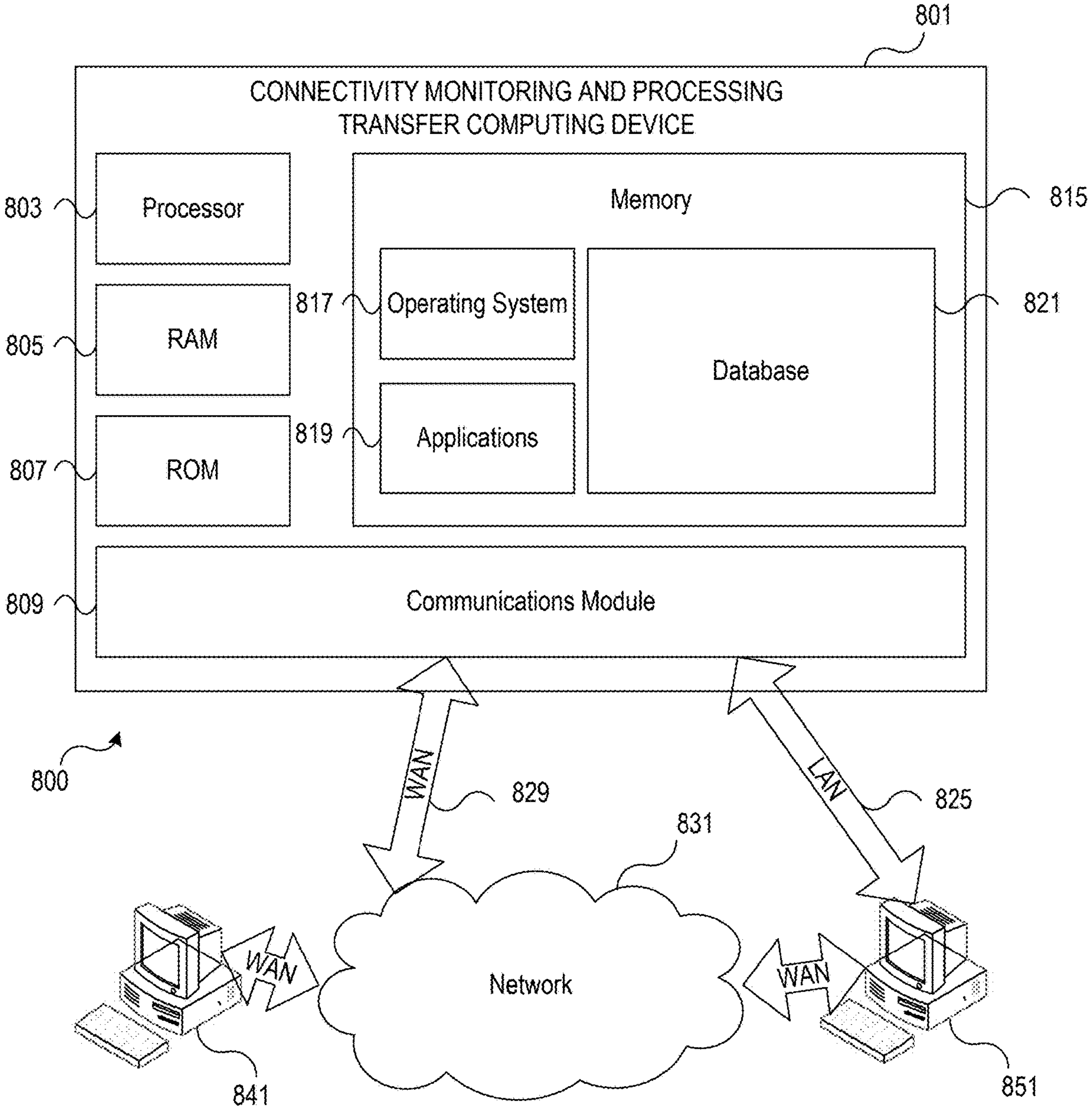
FIG. 8 illustrates one example environment in which various aspects of the disclosure may be implemented in accordance with one or more aspects described herein.

FIG. 8 depicts an illustrative operating environment in which various aspects of the present disclosure may be implemented in accordance with one or more example embodiments. Referring to FIG. 8, computing system environment 800 may be used according to one or more illustrative embodiments. Computing system environment 800 is only one example of a suitable computing environment and is not intended to suggest any limitation as to the scope of use or functionality contained in the disclosure. Computing system environment 800 should not be interpreted as having any dependency or requirement relating to any one or combination of components shown in illustrative computing system environment 800.

Computing system environment 800 may include connectivity monitoring and processing transfer computing device 801 having processor 803 for controlling overall operation of connectivity monitoring and processing transfer computing device 801 and its associated components, including Random Access Memory (RAM) 805, Read-Only Memory (ROM) 807, communications module 809, and memory 815. Connectivity monitoring and processing transfer computing device 801 may include a variety of computer readable media. Computer readable media may be any available media that may be accessed by connectivity monitoring and processing transfer computing device 801, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by connectivity monitoring and processing transfer computing device 801.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor (e.g., hardware processor) on connectivity monitoring and processing transfer computing device 801. Such a processor may execute computer-executable instructions stored on a computer-readable medium.

Software may be stored within memory 815 and/or storage to provide instructions to processor 803 for enabling connectivity monitoring and processing transfer computing device 801 to perform various functions as discussed herein. For example, memory 815 may store software used by connectivity monitoring and processing transfer computing device 801, such as operating system 817, application programs 819, and associated database 821. Also, some or all of the computer executable instructions for connectivity monitoring and processing transfer computing device 801 may be embodied in hardware or firmware. Although not shown, RAM 805 may include one or more applications representing the application data stored in RAM 805 while connectivity monitoring and processing transfer computing device 801 is on and corresponding software applications (e.g., software tasks) are running on connectivity monitoring and processing transfer computing device 801.

Communications module 809 may include a microphone, keypad, touch screen, and/or stylus through which a user of connectivity monitoring and processing transfer computing device 801 may provide input, and may also include one or more of a speaker for providing audio output and a video display device for providing textual, audiovisual and/or graphical output. Computing system environment 800 may also include optical scanners (not shown).

Connectivity monitoring and processing transfer computing device 801 may operate in a networked environment supporting connections to one or more remote computing devices, such as computing devices 841 and 851. Computing devices 841 and 851 may be personal computing devices or servers that include any or all of the elements described above relative to connectivity monitoring and processing transfer computing device 801.

The network connections depicted in FIG. 8 may include Local Area Network (LAN) 825 and Wide Area Network (WAN) 829, as well as other networks. When used in a LAN networking environment, connectivity monitoring and processing transfer computing device 801 may be connected to LAN 825 through a network interface or adapter in communications module 809. When used in a WAN networking environment, connectivity monitoring and processing transfer computing device 801 may include a modem in communications module 809 or other means for establishing communications over WAN 829, such as network 831 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:

at least one processor;

a communication interface communicatively coupled to the at least one processor; and a memory storing computer-readable instructions that, when executed by the at least one processor, cause the computing platform to:

detect an ongoing transaction initiated via a first processing infrastructure communicating via a first network;

monitor the ongoing transaction and the first network for communication interruptions;

detect, based on the monitoring, an interruption in communication with the first network;

based on the detected interruption, identify a second, alternate network for continued processing of the ongoing transaction;

transfer the ongoing transaction to a second processing infrastructure communicating via the second, alternate network; and continue processing the ongoing transaction via the second processing infrastructure communicating via the second, alternate network.

2. The computing platform of claim 1, wherein the ongoing transaction is processed to completion via the second processing infrastructure communicating via the second, alternate network.

3. The computing platform of claim 1, further including instructions that, when executed, cause the computing platform to:

during the continued processing, communicate, to the first processing infrastructure, data associated with the continued processing of the ongoing transaction at the second processing infrastructure communicating via the second, alternate network;

detect, based on continued monitoring of the first network, restoration of communication via the first network; and during the ongoing transaction, and based on the detected restoration of communication via the first network, transfer the continued processing of the ongoing transaction to the first processing infrastructure communicating via the first network for processing the transaction from a current step in the transaction to completion.

4. The computing platform of claim 3, wherein the data associated with the continued processing of the ongoing transaction is captured in parallel with the continued processing of the transaction.

5. The computing platform of claim 1, wherein the first network is a first type of network and the second, alternate network is a second type of network different from first type of network.

6. The computing platform of claim 5, wherein the first type of network is one of: WI-FI, cellular, or near-field communication and the second type of network is another of: WI-FI, cellular or near-field communication.

7. The computing platform of claim 1, wherein identifying the second, alternate network is performed in real-time.

8. The computing platform of claim 1, wherein identifying the second, alternate network includes:

identifying a plurality of available other networks including the second, alternate network;

prioritizing the available other networks based on one or more parameters; and selecting, based on the prioritizing, the second, alternate network from the plurality of available other networks.

9. The computing platform of claim 8, wherein the one or more parameters include number of hops associated with each other network, signal strength associated with each other network and proximity to each other network.

10. The computing platform of claim 1, wherein the first processing infrastructure processes the ongoing transaction via one of: an online banking application or a mobile banking application, and the second processing infrastructure continues processing of the ongoing transaction via short message service (SMS).

11. A method, comprising:

detecting, by a computing platform, the computing platform having at least one processor, and memory, an ongoing transaction initiated via a first processing infrastructure communicating via a first network;

monitoring, by the at least one processor, the ongoing transaction and the first network for communication interruptions;

detecting, by the at least one processor and based on the monitoring, an interruption in communication with the first network;

based on the detected interruption, identifying, by the at least one processor, a second, alternate network for continued processing of the ongoing transaction;

transferring, by the at least one processor, the ongoing transaction to a second processing infrastructure communicating via the second, alternate network; and continuing, by the at least one processor, processing the ongoing transaction via the second processing infrastructure communicating via the second, alternate network.

12. The method of claim 11, wherein the ongoing transaction is processed to completion via the second processing infrastructure communicating via the second, alternate network.

13. The method of claim 11, further including:

during the continued processing, communicating, by the at least one processor and to the first processing infrastructure, data associated with the continued processing of the ongoing transaction at the second processing infrastructure communicating via the second, alternate network;

detecting, by the at least one processor and based on continued monitoring of the first network, restoration of communication via the first network; and during the ongoing transaction, and based on the detected restoration of communication via the first network, transferring, by the at least one processor, the continued processing of the ongoing transaction to the first processing infrastructure communicating via the first network for processing the transaction from a current step in the transaction to completion.

14. The method of claim 11, wherein the first network is a first type of network and the second, alternate network is a second type of network different from first type of network.

15. The method of claim 14, wherein the first type of network is one of: WI-FI, cellular, or near-field communication and the second type of network is another of: WI-FI, cellular or near-field communication.

16. The method of claim 11, wherein identifying the second, alternate network is performed in real-time.

17. The method of claim 11, wherein identifying the second, alternate network includes:

identifying a plurality of available other networks including the second, alternate network;

prioritizing the available other networks based on one or more parameters; and selecting, based on the prioritizing, the second, alternate network from the plurality of available other networks.

18. The method of claim 11, wherein the first processing infrastructure processes the transaction via one of: an online banking application or a mobile banking application, and the second processing infrastructure continues processing of the ongoing transaction via short message service (SMS).

19. One or more non-transitory computer-readable media storing instructions that, when executed by a computing platform comprising at least one processor, memory, and a communication interface, cause the computing platform to:

detect an ongoing transaction initiated via a first processing infrastructure communicating via a first network;

monitor the ongoing transaction and the first network for communication interruptions;

detect, based on the monitoring, an interruption in communication with the first network;

based on the detected interruption, identify a second, alternate network for continued processing of the ongoing transaction;

transfer the ongoing transaction to a second processing infrastructure communicating via the second, alternate network; and continue processing the ongoing transaction via the second processing infrastructure communicating via the second, alternate network.

20. The one or more non-transitory computer-readable media of claim 19, further including instructions that, when executed, cause the computing platform to:

during the continued processing, communicate, to the first processing infrastructure, data associated with the continued processing of the ongoing transaction at the second processing infrastructure communicating via the second, alternate network;

detect, based on continued monitoring of the first network, restoration of communication via the first network; and during the ongoing transaction, and based on the detected restoration of communication via the first network, transfer the continued processing of the ongoing transaction to the first processing infrastructure communicating via the first network for processing the transaction from a current step in the transaction to completion.

* * * * *